(12) United States Patent
Kang et al.

(10) Patent No.: US 8,965,189 B2
(45) Date of Patent: Feb. 24, 2015

(54) CAMERA MODULE

(75) Inventors: Byung Woo Kang, Seoul (KR); Sang Min On, Seoul (KR); Soo Cheol Lim, Gyunggi-do (KR); Hee Su Kang, Gyunggi-do (KR); Sung Ryung Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/405,756

(22) Filed: Feb. 27, 2012

(65) Prior Publication Data

US 2013/0142502 A1 Jun. 6, 2013

(30) Foreign Application Priority Data

Dec. 5, 2011 (KR) .................. 10-2011-0129018

(51) Int. Cl.
*G03B 17/00* (2006.01)

(52) U.S. Cl.
USPC .......................................................... 396/55

(58) Field of Classification Search
USPC .......................................................... 396/55
See application file for complete search history.

(56) References Cited

U.S. PATENT DOCUMENTS

| 6,330,398 | B1 | 12/2001 | Tanaka et al. | |
| 6,818,702 | B1* | 11/2004 | Orikabe et al. | 525/107 |
| 2007/0146883 | A1* | 6/2007 | Akada et al. | 359/554 |
| 2007/0259141 | A1* | 11/2007 | Ohki | 428/35.2 |
| 2008/0044174 | A1 | 2/2008 | Kleverman | |
| 2008/0129830 | A1* | 6/2008 | Inoue et al. | 348/208.2 |
| 2008/0192124 | A1* | 8/2008 | Nagasaki | 348/208.11 |
| 2010/0079604 | A1* | 4/2010 | Washisu | 348/208.4 |
| 2010/0098394 | A1* | 4/2010 | Ishihara et al. | 396/55 |
| 2010/0208089 | A1* | 8/2010 | Chang | 348/208.5 |
| 2010/0214426 | A1* | 8/2010 | Kimura | 348/208.99 |
| 2011/0211821 | A1 | 9/2011 | Park et al. | |

FOREIGN PATENT DOCUMENTS

| JP | 7-159834 | 6/1995 |
| KR | 10-2008-0071700 | 8/2008 |
| KR | 10-2009-0048629 | 5/2009 |
| KR | 10-2010-0066678 | 6/2010 |
| WO | WO 2010/083965 A1 | 7/2010 |

OTHER PUBLICATIONS

Korean Office Action mailed Jan. 10, 2013 in corresponding Korean Patent Application No. 10-2011-0129018.

* cited by examiner

*Primary Examiner* — Clayton E LaBalle
*Assistant Examiner* — Dennis Hancock

(57) ABSTRACT

There is provided a camera module including: a housing; a lens unit mounted in the housing; a hand shake correction unit correcting a movement of the lens unit with respect to the housing; and a damping member disposed between the housing and the lens unit to thereby reduce the movement of the lens unit through the hand shake correction unit.

17 Claims, 9 Drawing Sheets

CAMERA MODULE

CROSS-REFERENCE TO RELATED APPLICATIONS

This application claims the priority of Korean Patent Application No. 10-2011-0129018 filed on Dec. 5, 2011, in the Korean Intellectual Property Office, the disclosure of which is incorporated herein by reference.

BACKGROUND OF THE INVENTION

1. Field of the Invention

The present invention relates to a camera module, and more particularly, to a camera module capable of suppressing vibrations in a lens unit.

2. Description of the Related Art

A camera module is an apparatus that receives light reflected from an object through one or more lenses to image sensors such as a CMOS, a CCD, or the like, to be converted into digital data.

In this case, the reflected light incident on the image sensor includes shape information regarding the object, and therefore helps to originally implement the shape thereof.

However, when the camera module is affected by hand shake or a moving object is photographed therewith, a focal position of the reflected light incident on the image sensor is changed or distance information with regard to the object is altered, such that it may be difficult to allow a clear image to be focused on the image sensor.

In consideration of the above-mentioned problems, recently developed camera modules include a hand shake correction unit correcting camera shake.

The hand shake correction unit drives a lens unit of the camera module by positional control to correct the camera shake. However, the driving of the lens unit causes an oscillation phenomenon or fine vibrations in the camera module, which may degrade resolution therein.

SUMMARY OF THE INVENTION

An aspect of the present invention provides a camera module capable of resolving resolution deterioration through a hand shake correction unit.

According to an aspect of the present invention, there is provided a camera module including: a housing; a lens unit mounted in the housing; a hand shake correction unit correcting a movement of the lens unit with respect to the housing; and a damping member disposed between the housing and the lens unit to thereby reduce the movement of the lens unit through the hand shake correction unit.

The damping member may be formed of a mixed material, including a silicone-based rubber component.

The damping member may be formed of a viscous fluid.

The damping member may include a sealing member formed of a vinyl material or epoxy material; and a viscous fluid accommodated in the sealing member.

The housing may include a first accommodating groove accommodating the damping member therein.

The housing may have a polyhedral shape having a polygonal cross section, and the first accommodating groove may be formed at a corner of the housing.

The lens unit may include a second accommodating groove formed in a position corresponding to the first accommodating groove and accommodating the damping member therein.

The lens unit may include a second accommodating groove accommodating the damping member therein.

The lens unit may have a polyhedral shape having a polygonal cross section and the second accommodating groove may be formed at a corner of the lens unit.

The lens unit may have an auto-focusing function.

The lens unit may include: a lens housing; a lens mounted in the lens housing; and a lens moving unit controlling a distance from the lens to an image sensor.

The image sensor may be provided in the housing.

The hand shake correction unit may include: a support member supporting the lens unit; and an actuator moving the lens unit in a direction perpendicular to an optical-axis direction.

The actuator may include a permanent magnet or a coil formed in the lens unit; and a coil or a permanent magnet formed in the housing.

The support member may include a plurality of elastic wires connecting the lens unit to the housing.

The elastic wires may be formed of a conductive material so as to electrically connect the lens unit to the housing.

The elastic wires may be coated with a resin material.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings.

In describing the present invention below, terms indicating components of the present invention are named in consideration of functions thereof. Therefore, the terms should not be understood as limiting the technical components of the present invention.

A camera module may include a hand shake correction unit to prevent an image degradation phenomenon due to user hand shake. Since the hand shake correction unit compensates for a movement of a lens unit due to user hand shake, it may help to allow a user-desired image of an object to be properly focused on an image sensor.

That is, the hand shake correction unit may move the lens unit in a direction opposite to a hand shake direction, such that the user-desired image of the object can be properly focused on the image sensor.

However, in the camera module having the hand shake correction function, a lens unit is maintained by an elastic member and therefore, a oscillation phenomenon may occur in the lens unit due to a restoring force of the elastic member during the hand shake correcting operation or during preparations therefor.

The oscillation phenomenon in the lens unit may degrade the resolution in the camera module and hinder consecutive hand shake correction function. As a result, there is a need to suppress the oscillation phenomenon in the lens unit due to the elastic member.

Further, the lens unit maintained by the elastic member may be easily shaken due to external force, which may degrade the durability of the lens unit and the overall camera module.

In order to solve the above-mentioned problems, and vibration characteristics caused by the elastic member may be appropriately controlled by mounting a damping member on the lens unit.

Further, a camera module capable of minimizing degradation in the durability of the lens unit due to an external impact may be provided.

Figure 1:
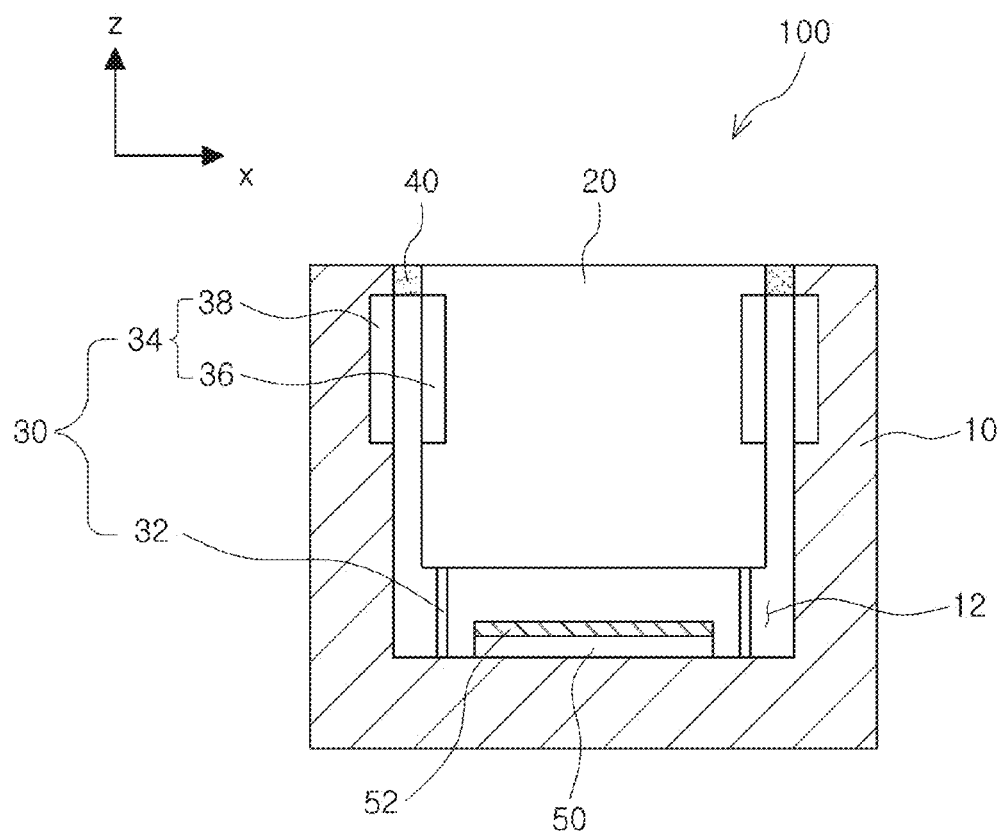
FIG. 1 is a cross-sectional view of a camera module according to a first embodiment of the present invention.
Figure 2:
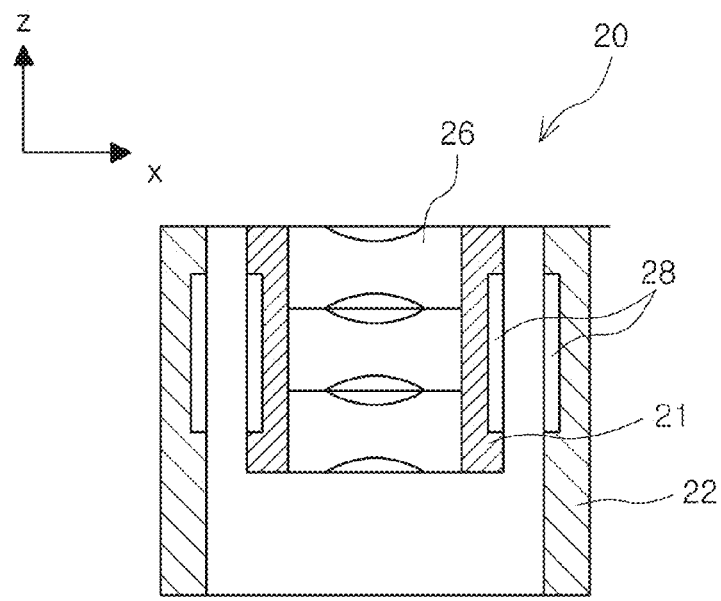
FIG. 2 is a cross-sectional view of a lens unit shown in FIG. 1.
Figure 3A:
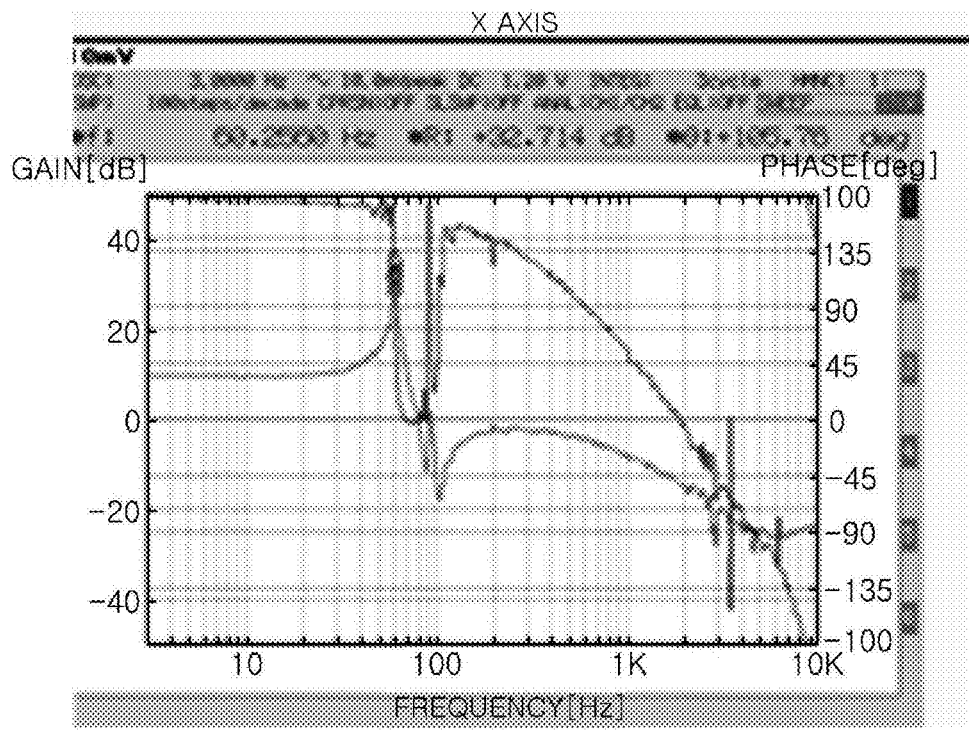
FIGS. 3A and 3B are graphs showing a frequency response curve of a camera module according to the related art.
Figure 3B:
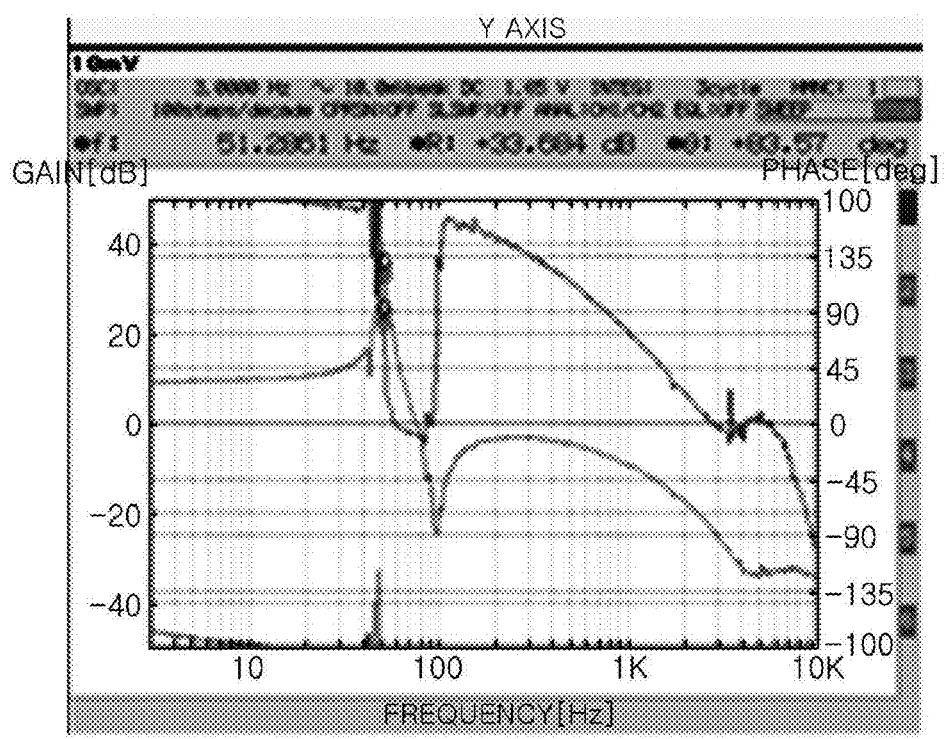
Figure 4A:
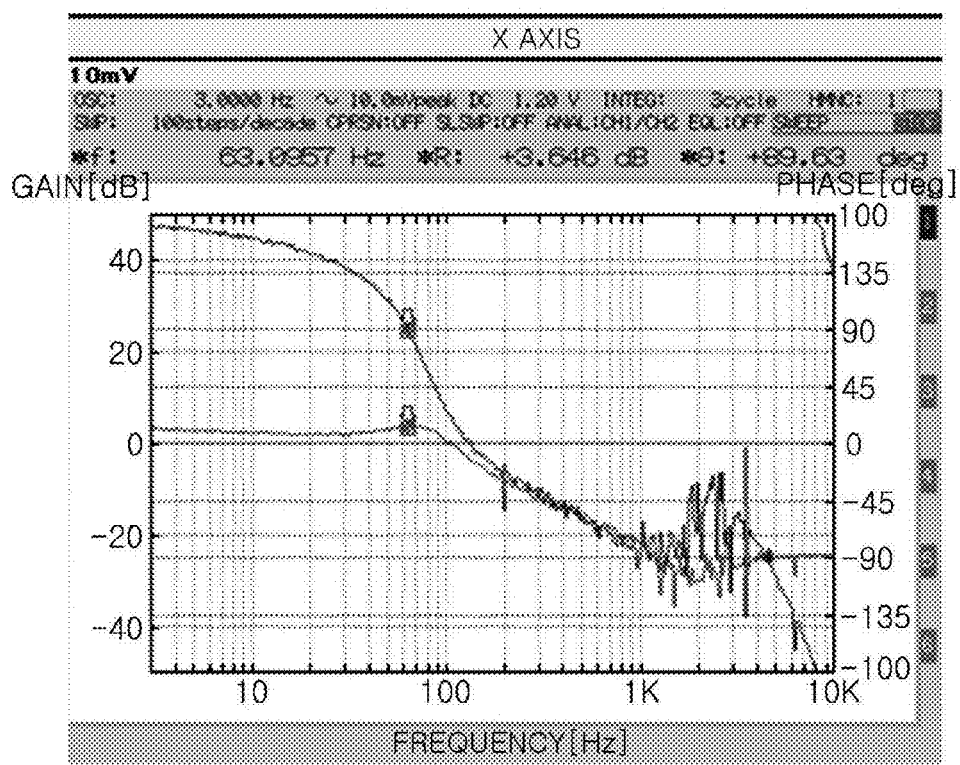
FIGS. 4A and 4B are graphs showing a frequency response curve of a camera module according to an embodiment of the present invention.
Figure 4B:
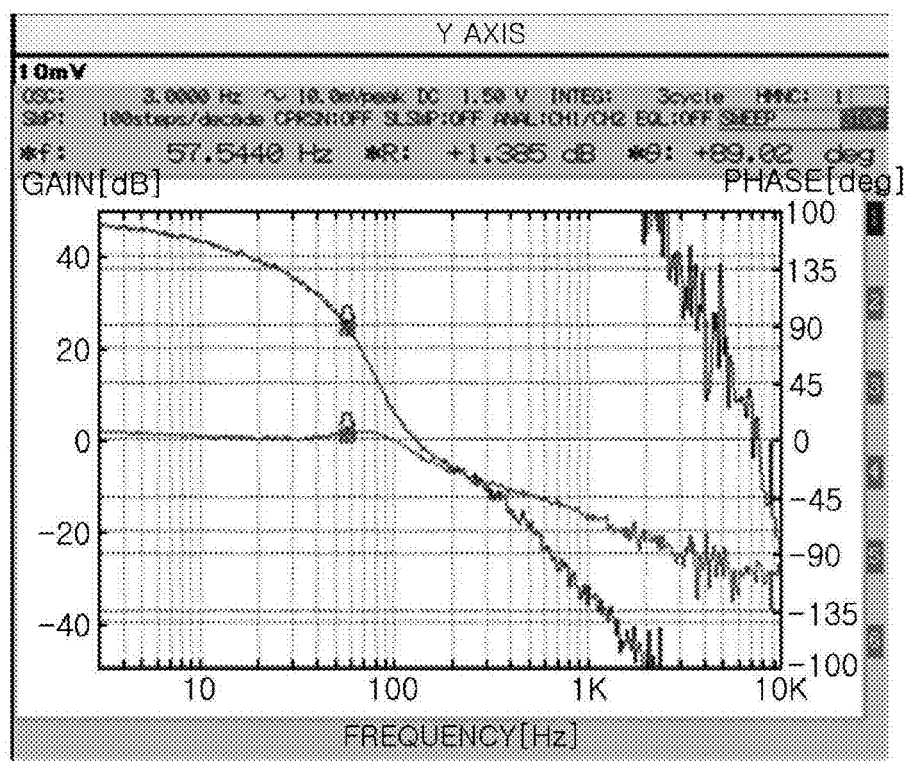
Figure 5:
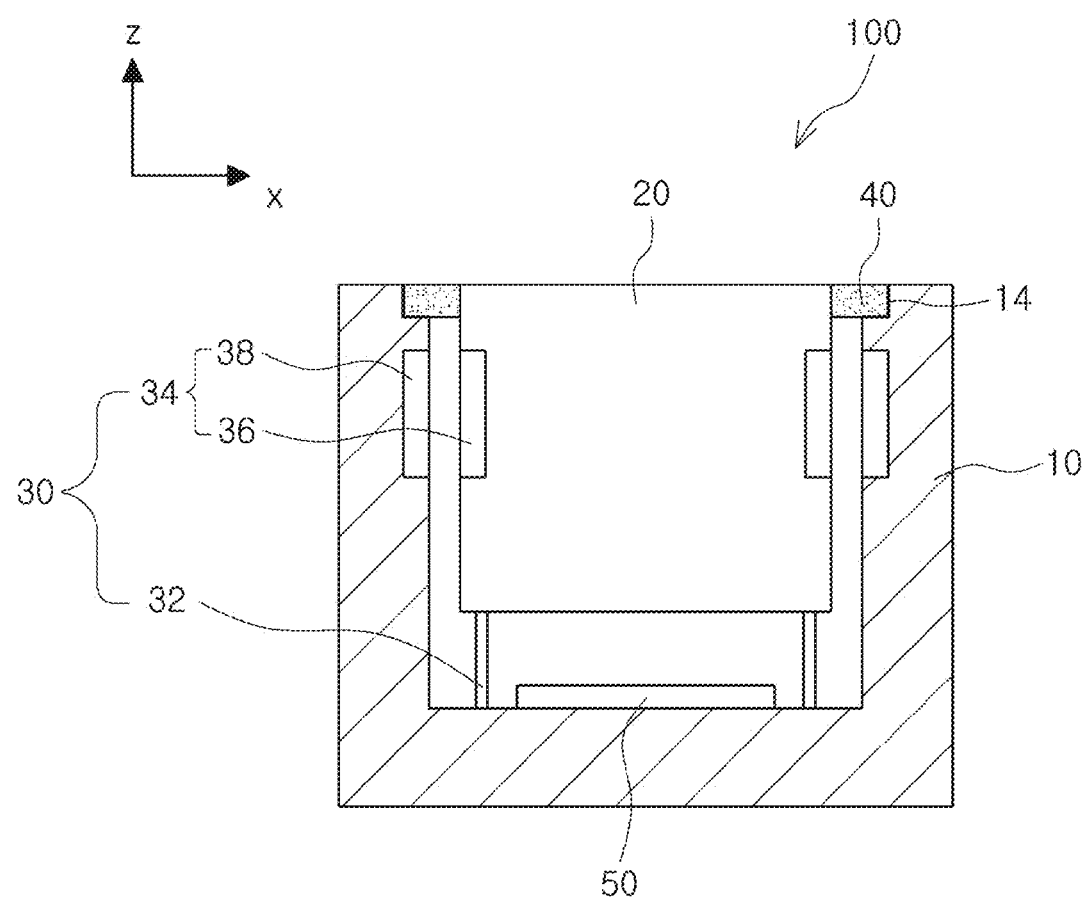
FIG. 5 is a cross-sectional view of a camera module according to a second embodiment of the present invention.
Figure 6:
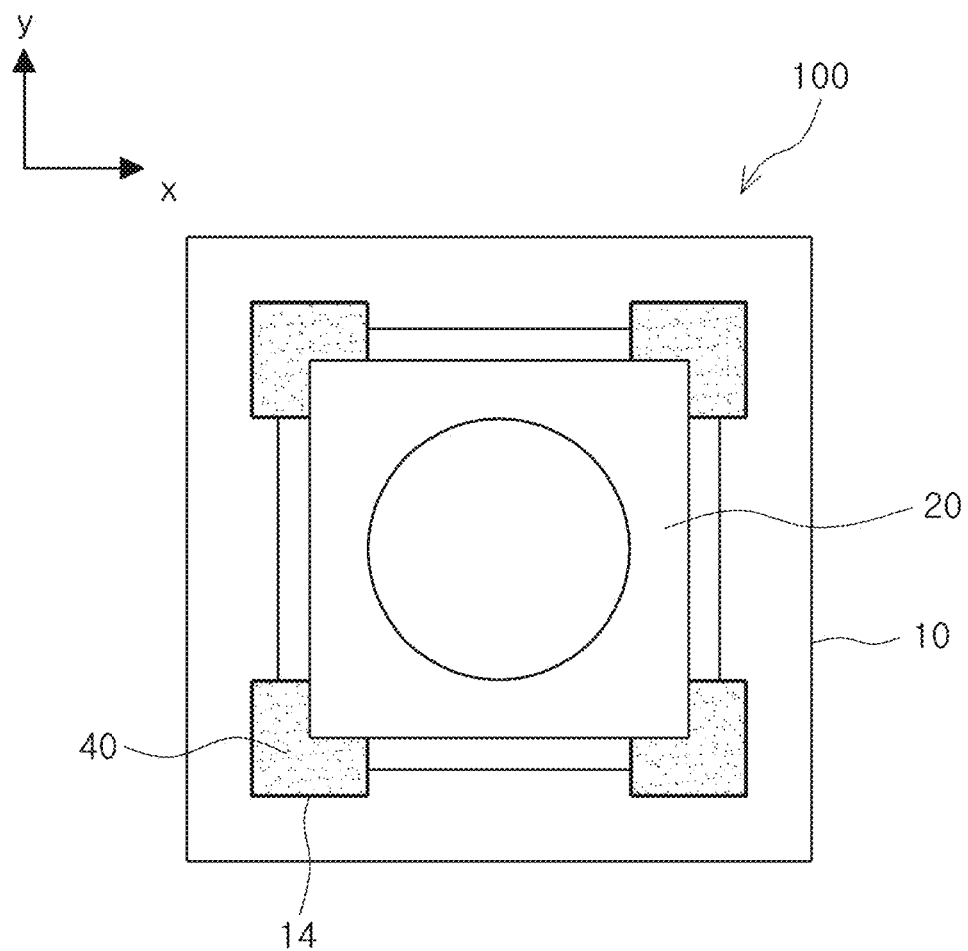
FIGS. 6 and 7 are plan views of the camera module shown in FIG. 5.
Figure 7:
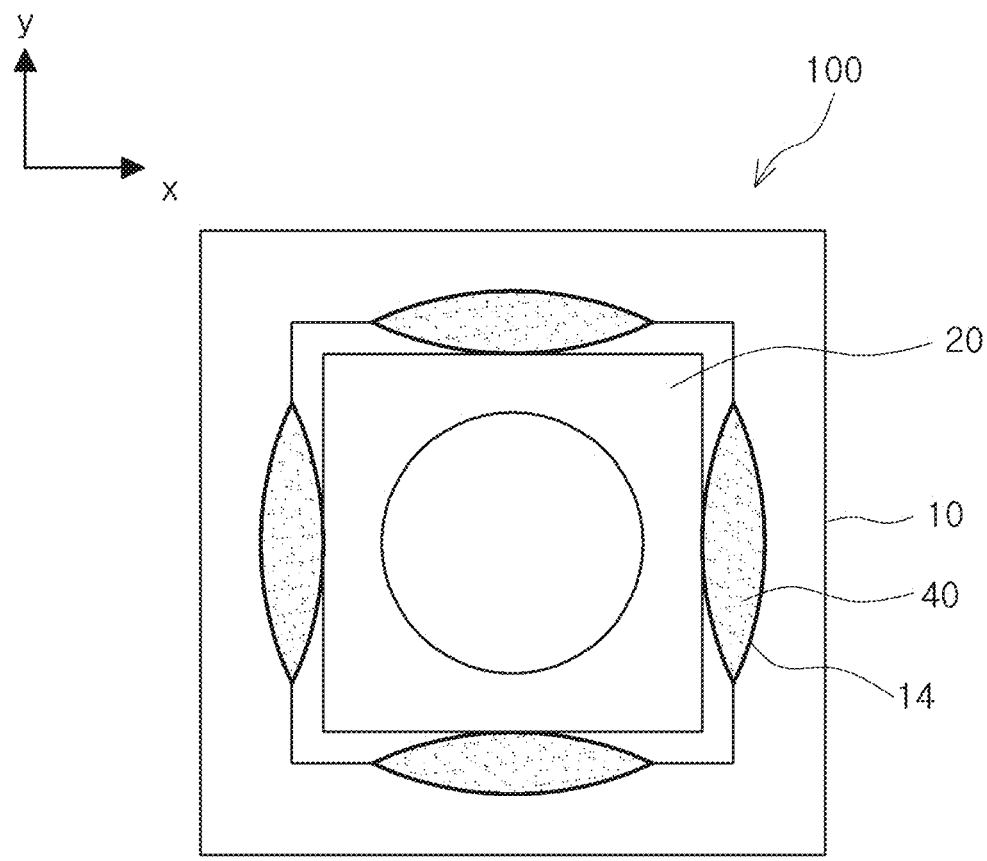
Figure 8:
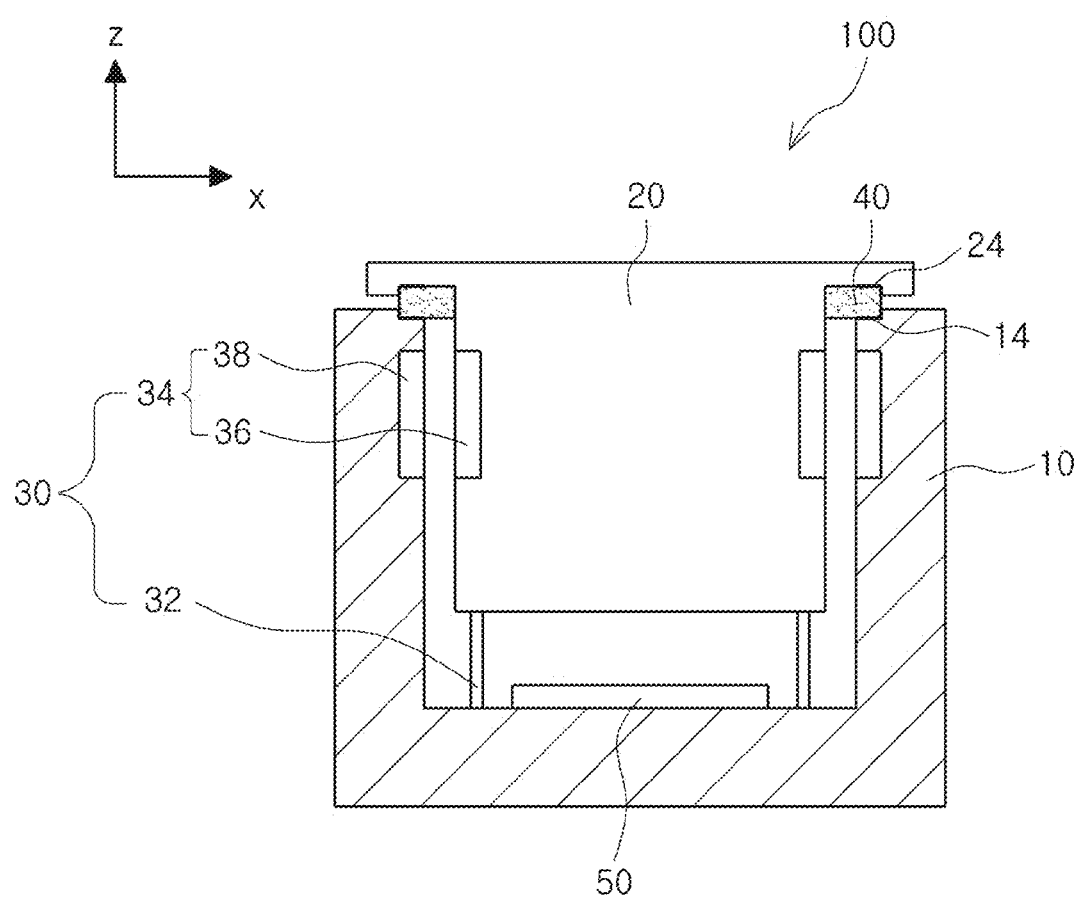
FIG. 8 is a cross-sectional view of a camera module according to a third embodiment of the present invention.
Figure 9:
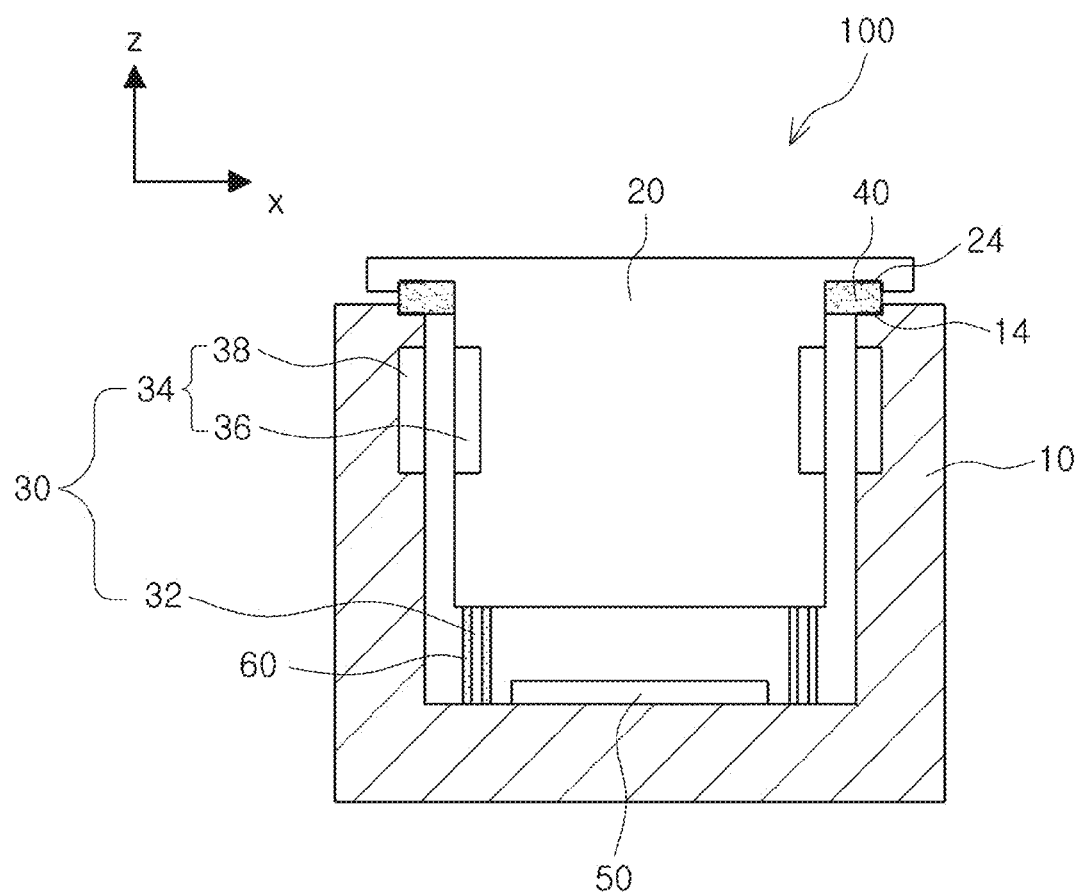
FIG. 9 is a cross-sectional view of a camera module according to a fourth embodiment of the present invention.
Figure 10:
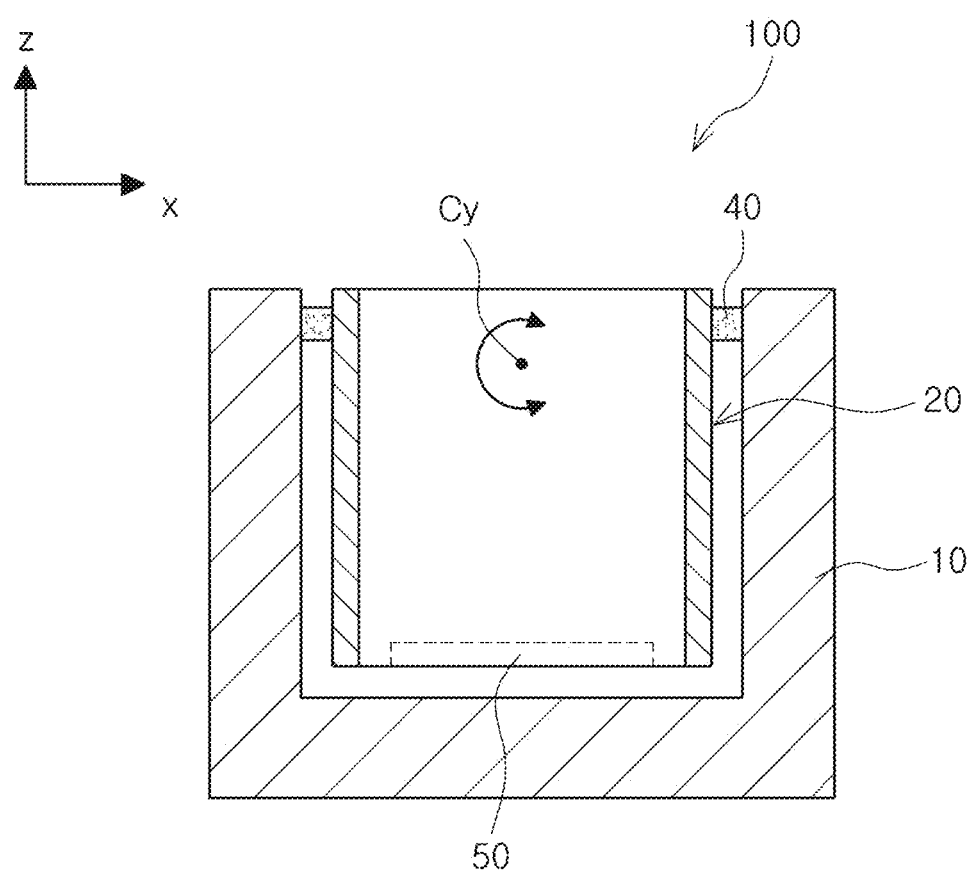
FIG. 10 is a cross-sectional view of a camera module according to a fifth embodiment of the present invention.

FIG. 1 is a cross-sectional view of a camera module according to a first embodiment of the present invention, FIG. 2 is a cross-sectional view of a lens unit shown in FIG. 1, FIGS. 3A and 3B are graphs showing a frequency response curve of a camera module according to the related art, FIGS. 4A and 4B are graphs showing a frequency response curve of a camera module according to an embodiment of the present invention, FIG. 5 is a cross-sectional view of a camera module according to a second embodiment of the present invention, FIGS. 6 and 7 are plan views of the camera module shown in FIG. 5, FIG. 8 is a cross-sectional view of a camera module according to a third embodiment of the present invention, FIG. 9 is a cross-sectional view of a camera module according to a fourth embodiment of the present invention, and FIG. 10 is a cross-sectional view of a camera module according to a fifth embodiment of the present invention.

A camera module according to a first embodiment of the present invention will be described with reference to FIGS. 1 to 4.

A camera module 100 according to the embodiment of the present invention may further include a housing 10, a lens unit 20, a hand shake correction unit 30, and a damping member 40 and may optionally include an image sensor 50. Further, although not shown, the camera module 100 may further include a gyro sensor that can detect the shaking of the lens unit 20.

The housing 10 may have a polyhedral shape of which one surface or multiple surfaces are opened and may form an exterior of the camera module 100. For example, the housing 10 may be a hexahedral shape having a rectangular cross section and may include an accommodating space 12 having an open top (with reference to directions depicted in FIG. 1). The housing 10 may be manufactured by injection molding and may be a body of an apparatus in which the camera module 100 is mounted.

The lens unit 20 may be disposed in the accommodating space 12 of the housing 10. As shown in FIG. 2, the lens unit 20 may include a lens housing 22 and a lens part 26 including one or more lenses. In this case, the lens part 26 may allow light reflected from an object to be incident to the image sensor 50. More specifically, the lens part 26 may include two or more lenses having different levels of refractive power.

Further, the lens part 26 may include lenses having different refractive indices so as to improve resolution in the camera module 100. To this end, individual lenses may be formed of different materials and may have different shapes.

Meanwhile, the lens part 26 in this embodiment of the invention includes three lenses, but the number of lenses may be increased or reduced according to applications and functions of the camera module 100. In this case, the plurality of lenses may be mounted in a lens barrel 21.

As shown in FIG. 2, the lens unit 20 may further include a component for an auto-focusing function. For example, the lens unit 20 may include a lens moving unit 28 moving the lens part 26 in an optical-axis direction (a Z-axis direction of FIG. 2). Here, the lens moving unit 28 may be configured of a permanent magnet and a coil or a piezoelectric element. In the former case, the permanent magnet and the coil may be formed in the lens housing 22 and the lens barrel 21, respectively. In the latter case, the piezoelectric element may be formed in the lens housing 22 and the lens barrel 21.

The hand shake correction unit 30 may be an apparatus correcting the shaking of the lens unit 20. That is, the hand shake correction unit 30 may be an apparatus correcting a phenomenon in which the lens unit 20 shakes in a planar direction (an X-Y plane of FIG. 1) perpendicular to the optical axis (the Z axis of FIG. 1) due to an external force. To this end, the hand shake correction unit 30 may include a support member 32 and an actuator 34.

The support member 32 may be formed of a material having elasticity. For example, the support member 32 may be an elastic wire formed of a metal material.

The support member 32 may connect the lens unit 20 to the housing 10. That is, one end of the support member 32 may be connected to the housing 10 and the other end of the support member 32 may be connected to the lens unit 20. Here, the support member 32 may support the lens unit 20 with respect to the housing 10 in a vertical direction (the Z-axis direction) and may allow the lens unit 20 to move in a horizontal direction (the X-Y plane direction).

The actuator 34 may be an apparatus that moves the lens unit 20 moved by the hand shake to an original position. To enable this, the actuator 34 may include a permanent magnet 36 and a coil 38.

The permanent magnet 36 may be formed in the lens unit 20. Specifically, the permanent magnet 36 may be formed on an outer wall of the lens unit 20 facing an inner wall of the housing 10. More specifically, the permanent magnet 36 may be formed on all of the outer walls of the lens unit 20.

The coil 38 may be formed in the housing 10. More specifically, the coil 38 may be formed on the inner wall of the housing 10. The coil 38 may be formed on all of the inner walls of the housing 10 so as to face the permanent magnets 36. The coil 38 may include a coil and a yoke and may be electrically connected to an external power supply source.

The actuator 34 applies current to the coil 38 according to a control signal through a gyro sensor and may move the lens unit 20 in the X-Y plane direction.

The damping member 40 may be formed in a gap between the housing 10 and the lens unit 20. The damping member 40 may damp the movement of the lens unit 20 in the X-Y plane direction and reduce the oscillation phenomenon of the lens unit 20. To this end, the damping member 40 may be formed of a material allowing for shear deformation.

For example, the damping member 40 may be formed of a material including silicon-based rubber components. Alternatively, the damping member 40 may be formed of a fluid having viscosity.

Here, the viscous fluid may be a material formed of a liquid component or a material in which a liquid component and solid particles are mixed. In the former, the viscous fluid may be formed of silicon oil. In the latter case, the viscous fluid may be a material including silicon oil and solid particles that are not easily reacted or melted in the liquid, and may further include silicon grease allowing the solid particles to be dispersed therein.

Meanwhile, examples of silicon oil may include dimethyl silicon oil, methyl phenyl silicon oil, methyl hydrogen silicon oil, fluorine modified silicon oil, and the like.

Further, examples of the solid particles that do not react with the silicon oil or are not melted thereby may include silicon resin powder, polymethyl silsesoxane powder, wet silica particles, dry silica particles, glass beads, glass balloon, and the like.

In addition, the damping member 40 may have adhesion. In this case, the damping member 40 may be attached to the housing 10 and the lens unit 20 so as not to be easily separated therefrom.

Further, the damping member 40 may include a sealing member for accommodating the viscous fluid. The sealing member may be formed of a resin material. The viscous fluid may be stably accommodated in the sealing member. In this case, evaporation and curing phenomenon of the viscous fluid may be effectively suppressed.

The image sensor 50 may be formed in the housing 10. Specifically, the image sensor 50 may be disposed on a surface of the housing 10 (an inner bottom surface of the housing 10 of FIG. 1) on which the optical axis of the lens unit 20 meets the accommodating space 12 of the housing 10. The image sensor 50 may project the image of the object through the reflected light input through the lens unit 20. As the image sensor 50, CCD and CMOS may be used. The image sensor 50 may be manufactured in a chip scale package (CSP) for miniaturization of the camera module 100.

In addition, when the image sensor 50 is a flip chip type, the image sensor 50 may be disposed on the housing 10 or a main substrate (not shown).

Further, the image sensor 50 may further include an IR filter 52 or a cover glass. The IR filter 52 may be formed on one surface (top surface of FIG. 1) of the image sensor 50 and may block infrared rays included in the reflected light.

Meanwhile, the IR filter 52 in this embodiment is formed on the image sensor 50, but the IR filter 52 may be provided in the lens unit 20 as needed. For example, the IR filter 52 may be disposed on the bottom of the lens unit 20. In addition, the IR filter 52 may be disposed in the lens housing 21 as needed. In addition, the IR filter 52 may be omitted as needed.

The camera module 100 includes the damping member 40 formed between the housing 10 and the lens unit 20 and therefore, excessive movement of the lens unit 20 may be suppressed and the vibration of the lens unit 20 due to the support member 32 may be reduced. These effects may be confirmed through a frequency response curve of the camera module shown in FIGS. 3A, 3B, 4A, and 4B.

According to the experimental results, the camera module according to the related art causes a phenomenon that the lens unit is severely vibrated after the hand shake correcting operation is performed. For this reason, in the case of the camera module according to the related art, a resonance point is clearly found in the frequency response curve as shown in FIGS. 3A and 3B.

Unlike this, in the case of the camera module according to the embodiment of the present invention, the lens unit is barely vibrated even after the hand shake correcting operation is performed. For this reason, in the case of the camera module according to the embodiment of the present invention, a particular resonance point is not found in the frequency response curve as shown in FIGS. 4A and 4B.

Therefore, the camera module according to the embodiment of the present invention may allow the image of the object to be clearly focused even after the hand shake correcting operation is performed, and accordingly, the resolution in the camera module may be improved.

Meanwhile, the damping member 40 in the above-mentioned embodiment is formed of the viscous fluid, but it may be formed of a sol mixture that may be changed into a gel state.

Next, a camera module according to a second embodiment of the present invention will be described with reference to FIGS. 5 to 7.

The camera module 100 according to the second embodiment of the present invention may include a first accommodating groove 16 in the housing 10 as shown in FIGS. 5 and 6. Specifically, the first accommodating groove 14 may be formed at a corner portion of the housing 10 and the damping member 40 may be accommodated in the first accommodating groove 14.

In the second embodiment of the present invention, the damping member 40 is disposed at the corner portion of the housing 10 having a relatively large gap and therefore, such that the shaking of the lens unit 10 may be effectively suppressed.

However, as shown in FIG. 7, the first accommodating groove 14 is formed at the center of the inner wall of the housing 10 as needed and the damping member 40 may be disposed in the first accommodating groove 14.

In this case, a volume of the first accommodating groove 14 may be large such that a large amount of the damping member 40 may be disposed therein, whereby the damping effect may be appropriately controlled.

Next, a camera module according to a third embodiment of the present invention will be described with reference to FIG. 8.

In the camera module 100 according to the third embodiment of the present invention, first and second accommodating grooves 14 and 24 may be formed in the housing 10 and the lens unit 20, respectively. That is, the top of the housing 10 may be provided with the first accommodating groove 14 and the lens unit 20 may be provided with the second accommodating groove 24. Here, the second accommodating groove 24 may be formed in a position corresponding to the first accommodating groove 14.

In the third embodiment of the present invention, the damping member 40 may perform the damping action on the movement of the lens unit 20 in the X-Y plane direction and the Z-axis direction, such that the stability of the lens unit 20 against an external force may be enhanced.

Next, a camera module according to fourth and fifth embodiments of the present invention will be described with reference to FIGS. 9 and 10.

The camera module 100 according to the fourth embodiment of the present invention may be different from the above-mentioned embodiments in terms of the feature of the support member 32. That is, the support member 32 according to this embodiment may be coated with a material including resin.

Since the support member 32 connecting the lens unit 20 to the housing 10 is required to allow for the movement of the lens unit 20 in the X-Y plane direction, the support member 32 may not be formed of a material having relatively large rigidity. However, this condition makes the support member 32 considerably thin, thereby easily causing the shaking of the lens unit 20 or fine vibrations.

In order to solve these problems, a coating member 60 may be formed on the surface of the support member 32 so as to secure the elasticity of the support member 32 without greatly increasing the rigidity of the support member 32.

Here, since the coating member 60 is formed of a resin material, it absorbs impacts and vibrations transferred to the support member 32, thereby suppressing the fine vibrations in the lens unit 20.

Meanwhile, the hand shake correction unit 30 in the above-mentioned embodiment moves in the X-Y plane direction, but the whole lens unit 20 may be rotated based on an axis Cy as shown in FIG. 10 as needed. In this case, the lens unit 20 may have the image sensor 50 disposed therein.

As set forth above, according to embodiments of the present invention, an oscillation phenomenon or fine vibrations caused during a hand shake correcting operation of a camera module can be effectively reduced.

Further, according to embodiments of the present invention, resolution in a camera module including the hand shake correcting function can be improved.

While the present invention has been shown and described in connection with the embodiments, it will be apparent to those skilled in the art that modifications and variations can be made without departing from the spirit and scope of the invention as defined by the appended claims.

What is claimed is:

1. A camera module comprising:
    a housing;
    a lens unit mounted in the housing;
    a hand shake correction unit correcting a movement of the lens unit with respect to the housing, the hand shake correction unit including a support member supporting the lens unit and an actuator moving the lens unit in a direction perpendicular to an optical-axis direction; and
    a damping member disposed between the housing and the lens unit and disposed in a direction perpendicular to the optical-axis direction to thereby reduce the movement of the lens unit through the hand shake correction unit, wherein
    the support member is connected to the lens unit and extended to be substantially parallel to the optical axis,
    the damping member damps the movement of the lens unit in a direction perpendicular to the optical-axis direction, and
    the lens unit includes:
        a lens housing;
        a lens mounted in the lens housing; and
        a lens moving unit controlling a distance from the lens to an image sensor.

2. The camera module of claim 1, wherein the damping member is formed of a mixed material, including a silicone-based rubber component.

3. The camera module of claim 1, wherein the damping member is formed of a viscous fluid.

4. The camera module of claim 1, wherein the damping member includes:
    a sealing member formed of a vinyl material or epoxy material; and
    a viscous fluid accommodated in the sealing member.

5. The camera module of claim 1, wherein the housing includes a first accommodating groove accommodating the damping member therein.

6. The camera module of claim 5, wherein the housing has a polyhedral shape having a polygonal cross section, and
    the first accommodating groove is formed at a corner of the housing.

7. The camera module of claim 5, wherein the lens unit includes a second accommodating groove formed in a position corresponding to the first accommodating groove and accommodating the damping member therein.

8. The camera module of claim 1, wherein the lens unit includes a second accommodating groove accommodating the damping member therein.

9. The camera module of claim 8, wherein the lens unit has a polyhedral shape having a polygonal cross section; and
    the second accommodating groove is formed at a corner of the lens unit.

10. The camera module of claim 1, wherein the lens unit has an auto-focusing function.

11. The camera module of claim 10, wherein the image sensor is provided in the housing.

12. The camera module of claim 10, wherein the image sensor is provided in the lens unit.

13. The camera module of claim 1, wherein the actuator includes:
    a permanent magnet or a coil formed in the lens unit; and
    a coil or a permanent magnet formed in the housing.

14. The camera module of claim 1, wherein the support member includes a plurality of elastic wires connecting the lens unit to the housing.

15. The camera module of claim 14, wherein the elastic wires are formed of a conductive material so as to electrically connect the lens unit to the housing.

16. The camera module of claim 14, wherein the elastic wires are coated with a resin material.

17. A camera module comprising:
    a housing;
    a lens unit mounted in the housing;
    a hand shake correction unit correcting a movement of the lens unit with respect to the housing;
    a damping member disposed between the housing and the lens unit and disposed in a direction perpendicular to the optical-axis direction to thereby reduce the movement of the lens unit through the hand shake correction unit; and
    an image sensor provided in the lens unit, wherein
    the damping member damps the movement of the lens unit in a direction perpendicular to the optical-axis direction.

* * * * *